Patented Oct. 30, 1923.

1,472,333

UNITED STATES PATENT OFFICE.

A. WILLARD JOYCE, OF NEWARK, NEW JERSEY, ASSIGNOR TO THE CHEMICAL FOUNDATION, INCORPORATED, OF NEW YORK, N. Y., A CORPORATION OF DELAWARE.

DISAZO COLORING MATTER.

No Drawing.    Application filed May 9, 1922.   Serial No. 559,602.

*To all whom it may concern:*

Be it known that I, A. WILLARD JOYCE, a citizen of the United States, and a resident of the city of Newark and State of New Jersey, have invented an Improvement in Disazo Coloring Matters, of which the following is a specification.

My invention relates to the production of disazo coloring matters and has as an object the production of new coloring matters in a practical and economical manner, which coloring matters shall be suitable for the accomplishment of dyeings upon cotton, wool, silk, and artificial silk.

I have found that by combining the tetrazo derivatives of diamino diaryl ketones having the general formula

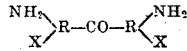

wherein X indicates hydrogen and a halogen atom, and R indicates aryl groupings, with naphthylamine derivatives of the general constitution

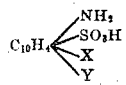

wherein X signifies hydrogen, chlorine and a hydroxyl group, and Y signifies hydrogen and a sulphonic acid group, disazo dyes are produced which range in shade from yellowish-red to violet. These coloring matters readily dye cotton, wool, silk and artificial silk, have marked fastness to light, acids, alkalis, washing and milling, and give level dyeings without the utilization of leveling agents.

For the preparation of these coloring matters I may employ diamino diaryl ketones which are obtainable from the corresponding diaryl methanes by a process described in the German Patent No. 289,108, which process consists, with particular reference to the preparation of diamino diphenyl ketone, in heating diamino diphenyl methane under a reflux for an extended period of time with a mixture of crystallized sodium sulphide and sulphur.

A diamino diaryl ketone obtained in accordance with the above outlined method is dissolved in water containing hydrochloric acid and diazotized by adding sodium nitrite thereto, the diazotized solution is then added to a solution containing a naphthylamine derivative, the mixture being subsequently heated to a temperature below the boiling point of said mixture and saturated with common salt whereupon the coloring matter is precipitated.

The coloring matters in the form of their dry compounds are reddish powders which dissolve in water forming red solutions, and in concentrated sulphuric acid forming reddish-blue solutions. When the aqueous solutions are treated with hydrochloric acid, the coloring matters precipitate as reddish-violet flakes. Dyeings upon cotton, wool, silk and artificial silk obtained in the usual manner, are deep red shades which are fast to light, acids, alkalis, washing and milling.

Furthermore, I have ascertained that the coloring matters containing primary amino groups may be diazotized and developed upon the fibre with a suitable developing agent yielding thereby dyeings having increased fastness characteristics.

In order to more specifically set forth and describe my process for the manufacture of disazo coloring matters, the following examples, serving as illustrative embodiments of a manner in accordance with which my invention may be carried into practical effect, are given. The parts are by weight.

Example I.

21.2 parts of p.p.[1] diamino diphenyl ketone are dissolved in 500 parts of water containing 50 parts of concentrated hydrochloric acid. This solution may be cooled to a temperature of about 5° to 10° C. and diazotized by means of a solution containing 14 parts of sodium nitrite. The diazotized solution is then added with constant stirring to a cooled solution containing 55 parts of sodium naphthionate and 55 parts of sodium carbonate. Reaction takes place at once with a partial separation of the dyestuff and is completed in a short time. The reaction mixture is then heated to a temperature of about 80° C. and saturated with common salt, whereupon the dye is precipitated and subsequently separated from the mother liquor by filtration.

The dyestuff in a dry state is a dark reddish-brown powder which dissolves in concentrated sulphuric acid with a reddish-blue color. With water it forms a red solution from which hydrochloric acid precipitates the dyestuff in red violet flakes. Cotton, wool, silk and artificial silk when dyed in the usual manner are dyed deep red shades.

Example II.

21.2 parts of p.p.¹ diamino diphenyl ketone are diazotized as described in Example I, and allowed to run into a cold solution containing 25 parts of 2-amino 5-naphthol-7 sulphonic acid dissolved in water together with 50 parts of sodium carbonate. The dye forms immediately and begins to separate from the solution as a red precipitate. After stirring for a period of time, for instance about one hour, the color mixture is heated to a temperature of about 80° C., saturated with common salt and the precipitated dye filtered off.

In a dry state the dyestuff is a reddish powder soluble in water giving a bright red solution from which hydrochloric acid precipitates the dye as red flakes. The color of the aqueous solution is not altered by the addition of acetic acid, but becomes of a slightly bluer shade upon the addition of caustic soda. With concentrated sulphuric acid it yields a violet color solution from which solution the addition of ice throws out a red precipitate. The coloring matter dyes cotton orange-red shades fast to light, washing and acids. Upon diazotizing on the fibre and developing with beta-naphthol a Bordeaux red is obtained.

When dyed on wool without a mordant in an acid bath, said bath containing for example acetic acid, clear orange-red shades are obtained, which shades are fast to light, washing and milling.

In the foregoing examples the formation reaction has been illustratively set forth as taking place under conditions of alkalinity. In addition I have found that said formation reactions may take place under conditions of acidity as well, yielding coloring matters possessing all the characteristics hereinbefore described, but with the difference that they are slightly bluer in shade.

Furthermore it is evident that instead of bringing into reaction one molecule of p.p.¹ diamino diaryl ketone base, with two molecules of a naphthylamine derivative I may cause the reaction to take place between one molecule of the base and one molecule of each of two different naphthylamine derivatives; and it will be understood that the invention is not limited to the specific constituents, amounts thereof, nor reaction conditions set forth in the above examples, but that the same may be modified and varied within the scope of the sub-joined claims.

I claim:

1. As new coloring matters the disazo compounds obtained by combining one molecule of a diamino diaryl ketone having the general formula

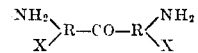

wherein X signifies hydrogen and a halogen, and R signifies an aryl group, with two molecules of a naphthylamine derivative of the following general composition:

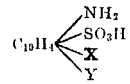

wherein X indicates hydrogen, chlorine and a hydroxyl group, and Y indicates hydrogen and a sulphonic acid group.

2. The new disazo coloring matters obtained by combining one molecule of diamino diphenyl ketone with two molecules of a naphthylamine derivative, said coloring matters in a dry state being reddish powders which dissolve readily in concentrated sulphuric acid and in water, precipitate from water solutions upon the addition of hydrochloric acid, and dye cotton, wool, silk and artificial silk red shades, fast to light, acids, alkalis and washing.

3. The disazo coloring matter obtained by combining one molecule of diamino diphenyl ketone with two molecules of 2 amino 5 naphthol 7 sulfonic acid, which dyestuff is a reddish powder soluble in water, giving a bright red solution, in concentrated sulphuric acid giving a violet colored solution, and dyeing cotton and wool orange-red shades, fast to light and washing.

In testimony whereof, I have signed my name to this specification this 8th day of May, 1922.

A. WILLARD JOYCE.